United States Patent [19]

Ammeraal et al.

[11] Patent Number: 5,482,560

[45] Date of Patent: Jan. 9, 1996

[54] BETA-LIMIT DEXTRIN FROM DULL WAXY STARCH

[75] Inventors: Robert Ammeraal, Worth; Robert Friedman, Chicago, both of Ill.

[73] Assignee: American Maize Technology, Inc., Dimmitt, Tex.

[21] Appl. No.: 281,408

[22] Filed: Jul. 27, 1994

[51] Int. Cl.$^6$ ............................ C08B 31/00; C08B 37/16; C08B 35/00; C13K 1/06
[52] U.S. Cl. ......................... 127/40; 536/102; 536/103
[58] Field of Search .............................. 127/40; 536/102, 536/103

[56] References Cited

U.S. PATENT DOCUMENTS

| | | | |
|---|---|---|---|
| 3,492,203 | 1/1970 | Mitsuhashi | 195/31 |
| 3,708,396 | 1/1973 | Mitsuhashi et al. | 195/31 R |
| 3,962,465 | 6/1976 | Richter et al. | 426/48 |
| 4,028,186 | 6/1977 | Sakai | 195/31 R |
| 4,780,149 | 10/1988 | Kaper et al. | 127/38 |
| 4,782,143 | 11/1988 | Morehouse et al. | 536/102 |
| 4,789,557 | 12/1988 | Friedman et al. | 426/578 |
| 4,840,807 | 6/1989 | Yoshida et al. | 426/48 |
| 5,089,171 | 2/1992 | Chiu | 127/40 |
| 5,185,176 | 2/1993 | Chiu | 426/651 |

FOREIGN PATENT DOCUMENTS

| | | | |
|---|---|---|---|
| 5246290 | 2/1975 | Japan | C13K 7/00 |
| 1268096 | 3/1972 | United Kingdom | C13K 7/00 |
| 1426976 | 3/1976 | United Kingdom | C13K 7/00 |
| 0289138 | 11/1988 | United Kingdom | C12N 9/28 |

OTHER PUBLICATIONS

Starch/Starke 39 (1987) Nr. 8, S.259–266, N. Inouchi et al., "Chain Length Distribution of Amylopectins of Several Single Mutants and the Normal Counterpart, and Sugary–1 Phy toglycogen in Maize " (Zea mays L.) month not available.
II. Linear and Branched Starch Oligosaccharides—pp. 126–128, "Enzymic Methods for Preparation"—Keiji Kainuma (month not available).
"The Action of Sweet Potato Beta–Amylase on Glycogen and Amylopectin: Formation of a Novel Limit Dextrin"—pp. 488–492, E. Y. C. Lee, Archives of Biochemistry and Biophysics, 146 (1971) Jul./Apr. 1971.
IV. Enzymes in the Hydrolysis and Synthesis of Starch—pp. 102–106—John F. Robyt (month not available).

*Primary Examiner*—Paul Lieberman
*Assistant Examiner*—Patricia L. Hailey
*Attorney, Agent, or Firm*—Lucas & Just

[57] ABSTRACT

Beta-limit dextrins manufactured from dull waxy starch have a unique size and structure compared to conventional beta-limit dextrins. Their degree of polymerization is 15,000 to 20,000 and DE of below 1. They are soluble and more stable in aqueous solutions than conventional beta-limit dextrins which make them good carriers for flavoring oils and good beverage clouding agents.

13 Claims, No Drawings

BETA-LIMIT DEXTRIN FROM DULL WAXY STARCH

This invention relates to food and, more specifically, to a novel beta-limit dextrin made from a dull waxy starch which can be used as a flavor carrying agent as well as a beverage clouding agent in foods.

Beverage flavor oils are not completely water soluble. A carrier, dispersant or encapsulating agent is frequently employed to stabilize and distribute the flavor substance evenly throughout the beverage. Conventionally, starch derivatives such as dextrins and maltodextrins as well as natural gums are used as carriers for flavor oils.

Beverage clouding agents are used to provide a cloudy appearance to a beverage such as citrus flavored beverages. In the past, materials such as brominated vegetable oils, or other chemically modified materials, have been utilized as beverage clouding agents. Questions regarding the possible safety of these materials have caused them to fall into regulatory disfavor recently. Vegetable gums have also been used, but these materials are often derived from raw materials which come from distant foreign countries, and their supply and quality has not always been reliable.

Additionally, the general public is increasingly looking for food products which are native products without chemical molification.

There is a need for a beverage clouding agent and a flavor carrying agent which comes from a reliable domestic source is not chemically modified, and is effective in beverage systems. In addition, such a product should provide an effective oxygen barrier, and a high molecular weight to enhance the bulk of the final product. Additionally, there should be an absence of low molecular weight cotaminants, such as dextrose and maltose.

It has now been discovered that a beta-limit dextrin made from a dull waxy starch is an excellent flavor carrier and beverage clouding agent. The beta-limit dextrin of the present invention is a natural product produced by the action of a beta amylase on an aqueous slurry of dull waxy starch. It has been found that the beta-limit dextrin of the present invention has a DE of below about 1 and a degree of polymerization of about 15,000 to about 20,000 (weight average) peak molecular weight as determined by SEC. It has also been found that the beta-limit dextrin of the present invention can produce a solution having a solids content as high as 40% by weight at room temperature (22° C.). This makes the beta-limit dextrin of the present invention ideal as a beverage clouding agent, a thickener for gum candies, useful in extruded products, useful as a bulking agent, not to mention useful as a carrier for volatile ingredients for spray drying.

Because of their molecular weight, cold water solubility and excellent water holding capacity at low (approaching Newtonian) viscosity, the beta-limit dextrins of the present invention can be used in low fat products where mouth feel adjustment is important. Fat replacement requires adjustment of mouth feel to simulate natural fat. Thus, the beta-limit dextrins of the present invention can be used in foods of low fat to provide a proper mouth feel to the product. In other words, the beta-limit dextrins of the present invention can function as a fat replacer in foods.

Also, because he beta-limit dextrins of the present invention, although being very soluble, come to solubility equilibrium very slowly, they can function as slow release agents in appropriate applications such as slow release agents for delivery of non-caloric sweeteners and drugs.

Additionally, because the beta-limit dextrins of the present invention have good water holding activity, low dextrose equivalent, limited enzyme susceptibility, and water solubility, they can function successfully for acceleration of wound healing.

The starch used to make the beta-limit dextrin of the present invention is obtained from a starch bearing plant with a dull waxy (duwx) homozygous genotype. The term duwx starch means not only starch obtained from a starch bearing plant that has a duwx homozygous genotype duduwxwx but also translocations, inversions and other variants that contain the duwx genotype.

Any plant source which produces edible starch and which can be crossbred to produce a plant having a duwx homozygous genotype may be used. It has been found that waxy maize, waxy rice, waxy barley and waxy sorghum have the mutant waxy (wx) gene while the dull (du) gene is obtained from cereal grains such as maize, rice, barley and sorghum. Maize is the preferred plant source. The waxy gene is reported to be located on chromosome 9 of the maize chromosomes. See "Development Genetics," Volume 5, pages 1–24, 1984. The dull gene is reported to be located on chromosome 10 of the maize chromosomes.

Generally, to obtain a starch bearing plant with both double recessive mutants of the du and wx genotype, a plant of a wx mutant is crossed with a plant having a du mutant and thereafter inbred to obtain a plant homozygous in duwx. After the homozygous duwx genotype is obtained, standard breeding techniques are used to obtain hybrid vigor. Hybrids are preferred because of their high starch yield compared to inbred lines. As is well-known to those in the art of corn processing, seed corn is different than the corn harvested for food. The method of crossbreeding plants and of obtaining specific genotypes in the offspring as well as breeding to obtain hybrid vigor is conventional.

Extraction of duwx starch from the plant is well known and typically entails a milling process, either dry or wet. Milling techniques to extract the starch from the plant are conventional. The use of a dull waxy starch is taught in U.S. Pat. Nos. 4,789,557 and 5,147,665.

The enzyme used to treat the dull waxy starch and convert the dull waxy starch into the beta-limit dextrin of the present invention is a beta-amylase obtained from vegetable and, more specifically, a beta-amylase obtained from barley. Suitable sources of this enzyme include cereals, e.g. barley, oats, rye and wheat, especially during germination, and also soya beans and sweet potatoes. The amount of enzyme used in the present invention is about 1.0% to about 0.1% by weight starch and, more preferably, about 0.2%.

In order to make the beta-limit dextrin of the present invention, an aqueous slurry of duwx starch granules having a solids content between about 5% by weight to about 40% by weight is prepared and then cooked through a jet cooker to gelatinize the starch granules. The formation of the slurry and the jet cooking is done in a conventional manner using conventional equipment.

The resulting beta-limit dextrins are then recovered and dried in a conventional manner using conventional equipment. Good results have been achieved by spray drying the recovered beta-limit dextrin to a moisture content below about 12% by weight and, more preferably, about 5%. Other drying methods may also be used including drum dryer, falling or rising film evaporators, freeze drying, tray drying and other known methods.

Generally, during recovery of the beta-limit dextrins of the present invention, maltose is removed from the slurry by any conventional means such as ultrafiltration. The maltose may be removed from the limit dextrin by means other than ultrafiltration. Ethanol (0.5 volumes) precipitates the limit dextrin from its solution. Three to four precipitations reduce the maltose to about 1%. Decantation from the gummy precipitate followed by resolution in water with mechanical stirring was sufficient. Likewise gel-filtration separations have been described. In addition, alternative methods that allow separation of maltose and limit dextrin may be used.

In one specific example, the starch is slurried, at about 10% solids, and cooked through a jet at about 220° C., cooled rapidly, e.g. through a flash cooler, and then digested with beta-amylase at 55°–60° C. and pH 5.0–5.5 at about 0.2% enzyme (dry basis) for 48 hours.

Preferably the by-product of the reaction (maltose) is removed from the beta limit dextrin. This is done in a conventional manner using conventional equipment. Good results have been obtained by a combination of ultrafiltration followed by diafiltration while the conversion is taking place to prevent feedback inhibition by the by-product. The filtrate stream is concentrated, during the digestion, by evaporation (very dilute washings are best discarded) and the maltose recovered by crystallization or other suitable process. After the conversion is complete, the protein and lipid (mud) are removed by high speed centrifugation in a Sharples or similar centrifuge. This syrup can be concentrated by processes well known in the art and then conveniently spray-dried to a non-hygroscopic white powder or it can be spray-dried without concentration.

The product of the conversion to limit dextrin may also be used without removal of the maltose produced or after partial removal of the maltose. The viscosity of these solutions is primarily a function of the limit dextrin present and there are applications where the maltose is not detrimental.

The beta-limit dextrins of the present invention are useful in forming emulsions of flavor oils for encapsulation in a dry product or for producing a cloud in beverages. Solutions up to 40% solids can be prepared at room temperature. Typically four parts of a 20% solution are homogenized with one part of flavor oil. The emulsion is then spray dried to form an oil containing powder. Also a concentrated emulsion may also be prepared and added as a flavor carrier and clouding agent to drink mixes.

These and other aspects of the present invention may be more fully understood by reference to the following examples.

EXAMPLE 1

This example compares a beta-limit dextrin made in accordance with the present invention and a beta-limit dextrin made from a conventional waxy maize starch.

In order to make the dextrin of the present invention, starch from the dull waxy maize variety, 10 lbs (10% moisture) in 90 lbs of water, was jet-cooked at about 220° C., pumped at 1 GPM through about 1133 cc of 1 in (224 cm by 5.07 cm$^2$) pipe, a holding time of 0.3 min (18 s), into a 30 gallon jacketed tank. After filling the tank, average about 6 minutes at about 190° C., the tank was cooled with cold tap water at 55°–60° C. Then 20.4 gm (0.5%) of a commercial beta-amylase enzyme, free of alpha-amylase activity, was added to the tank. During digestion for 48 hours, the mixture was circulated through a Koch membrane filter, 10K molecular weight cutoff, with continuous washing with deionized water. For unattended operation the water input was about equal to the filtrate output. The recycle pump rate was about 2–5 GPM and filtrate outflow 100–200 ml/min. The total wash volume was about three times the initial volume (48 gal). The retentate contained about 3 lbs of limit dextrin product in about 8 gal of solution. This solution was pumped through a Carl Padberg Schnellzentrifugen (high speed continuous flow centrifuge) at 1–2 liters/min and the overflow was collected. This resulting syrup was then dried by spray drying in a conventional manner and designated dull waxy-1.

In order to make a control starch for the present invention, a starch from the white waxy maize variety was slurried and treated with a commercial amylase in a manner similar to dull waxy-1 above. After the 48 hour digest, one half (0.5) volume of punctilious ethanol was added to the digest and it was stored in the cold. The supernatant was decanted from the gummy precipitate and water was added to the precipitate with stirring to redissolve it and the ethanol precipitation was repeated until the maltose level was about 0.5% (3 times). The washed precipitate was dried at 110° C. under vacuum in stainless steel pans, after steam table evaporation of excess water. This product was designated white waxy-1.

Finally, two more samples of dull waxy beta-limit dextrins in accordance with the present invention were prepared. A second slurry of dull waxy starch was treated in a similar manner to the dull waxy-1 sample above, except instead of spray-drying it was pan dried. This product was designated dull waxy-2. The third sample of dull waxy beta-limit dextrin was prepared by forming a composite of a number of other dull waxy beta-limit dextrins prepared in a manner similar to dull waxy-1 above, except that the amount of starch used to form the slurry was less than 10 lbs. The composite product from these smaller runs was designated dull waxy-3.

The weight average molecular weight and viscosity of 20% solids solutions were determined and compared for all four samples. The results are reported in Table I below.

TABLE I

| Sample | Peak MOL WT* | DPW** | Brookfield Viscosity at 20% Solids | | |
|---|---|---|---|---|---|
| | | | 20 RPM UP | 100 RPM | 20 RPM DOWN |
| White Waxy 1 | 4.543 | 28,043 | 1194 | 1000 | 1150 |
| Dull Waxy-1 | 3.453 | 21,315 | 1015 | 888 | 1080 |
| Dull Waxy-2 | 2.771 | 17,105 | 498 | 480 | 500 |
| Dull Waxy-3 | 2.303 | 14,216 | 398 | 350 | 350 |

*Apparent SEC Peak Mol Wt (× 10$^6$) wt. average
**Average degree of polymerization calculated from the peak molecular weight The SEC peak molecular weight and the Brookfield viscosities were obtained in a conventional manner with conventional equipment.

EXAMPLE 2

Emulsions were prepared with dull waxy-1 and dull waxy-2 of Example 1 above. These contained 1 part oil, 1 part limit dextrin, and 3 parts water which were emulsified in a Waring blender. The dull waxy-1 provided the more stable emulsion although upon standing for 30 days oil separation was evident in both. Table II below gives the viscosities of these emulsions, fresh and after 3 days storage.

TABLE II

| Sample | Days Storage | Brookfield Viscosities (20% Solids) | | |
|---|---|---|---|---|
| | | 20 RPM UP | 100 RPM | 20 RPM DOWN |
| Dull Waxy-1 | 0 | 0452 | 4270 | 5200 |
| Dull Waxy-1 | 3 | 24975 | 6640 | 10660 |
| Dull Waxy-2 | 0 | 2946 | 1006 | 2820 |
| Dull Waxy-2 | 3 | 2996 | 1000 | 2990 |

EXAMPLE 3

This example compares the molecular weight of beta-limit dextrins made in accordance with the present invention to beta-limit dextrins made from conventional waxy maize. Table III below reports the data.

TABLE III

| Sample | MOL. WT. ($\times 10^6$) |
|---|---|
| Dull Waxy-4 | 3.408 |
| Waxy | 2.957 |

The beta-limit dextrins were prepared in accordance with Example 1 above and the molecular weights were determined as in Example 1 above.

EXAMPLE 4

This example illustrates the superior ability of the beta-limit dextrins of the present invention to act as a carrier compared to conventional carriers.

Two beta-limit dextrins were prepared, one using duwx starch and the other using a conventional waxy starch. In both cases, the maltose portion was not removed. Both samples were spray dried to produce a dried product. In order to compare the two, two separate formulations were prepared. Both were made by mixing 600 grams of beta-limit dextrins with 1400 grams of water and then adding in 133.24 grams of an orange oil. After thoroughly mixing the orange oil into the slurry, each slurry was spray dried down to a moisture level of 3.5% by weight.

Prior to spray drying, each slurry was checked for viscosity. It was found that the emulsion of the duwx beta-limit dextrin had a Brookfield viscosity of 430 cps while the emulsion of the waxy beta-limit dextrin had a Brookfield viscosity of 670 cps. Both viscosities were measured in a conventional manner using conventional equipment.

After spray drying, each product was checked for percent of oil retained. It was found that the duwx beta-limit dextrin retained 75.43% by weight of the oil while the waxy beta-limit dextrin retained only 71.5% by weight of the oil. The stability of an aqueous emulsion made up from the spray dried product was also studied. To study the stability, an aqueous solution of both products was prepared at 0.2% solids and stored at 45° C. for a period of 35 days. Over the 35-day period, it was found that the beta-limit dextrin of duwx starch was more stable than the beta-limit dextrin of waxy starch. Specifically, it was found that the beta-limit dextrin of duwx starch had an absorbence of 1.5 initially (Day 0) and an absorbence of 1.3 after 35 days. The beta-limit dextrin of waxy starch had an absorbence of 1.25 initially and 0.8 after 35 days of storage. These values were measured spectrophotometrically at 400 nm in a 1 centimeter cell using water as a blank.

It will be understood that the claims are intended to cover all changes and modifications of the preferred embodiments of the invention herein chosen for the purpose of illustration which do not constitute a departure from the spirit and scope of the invention.

What is claimed is:

1. A flavor carrier comprising a beta-limit dextrin having a DE less than about 1 and a degree of polymerization as determined by a weight average of about 15,000 to about 20,000, said dextrin obtained from a duwx starch, said duwx starch obtained from a starch bearing plant with a dull waxy homozygous genotype.

2. The flavor carrier of claim 1 wherein the duwx starch is obtained from maize.

3. A method for making a flavor carrier comprising:
   treating an aqueous slurry of duwx starch, said duwx starch obtained from a starch bearing plant with a dull waxy homozygous genotype with a beta-amylase enzyme obtained from a vegetable to produce a beta-limit dextrin having a DE less than about 1; and
   recovering the beta-limit dextrin for use as a flavor carrier.

4. The method of claim 3 wherein said duwx starch is obtained from maize.

5. The method of claim 3 wherein said treatment step is conducted at a temperature of about 55° to 60° C. and at a pH of about 5 to 5.5 for a period of up to about 48 hours.

6. The method of claim 3 wherein prior to said treatment step, the process further comprises the following sequential steps:
   forming an aqueous slurry of duwx starch granules and water wherein said slurry has a solids content of about 10% by weight; and
   jet-cooking said slurry to gelatinize said starch granules.

7. The method of claim 3 wherein subsequent to recovering said bet-a-limit dextrins, said recovered beta-limit dextrins are subject to a step of spray-drying to obtain a white powder having a moisture content of about 12% by weight or less.

8. The method of claim 3 wherein said slurry is treated with about 0.2% by weight with said beta-amylase.

9. The method of claim 3 wherein the beta-amylase enzyme is obtained from barley.

10. The method of claim 3 wherein the slurry is treated with about 0.1 to about 1.0% by weight of said beta-amylase.

11. A beta-limit dextrin having a DE less than about 1 and a degree of polymerization as determined by a weight average of about 15,000 to about 20,000, said dextrin obtained from a duwx starch, said duwx starch obtained from a starch bearing plant with a dull waxy homozygous genotype.

12. The beta-limit dextrin of claim 11 wherein the duwx starch is obtained from maize.

13. The beta-limit dextrin of claim 11 wherein said beta-limit dextrin is used as a flavor carrier, a beverage clouding agent, or a fat replacer in foods.

* * * * *

UNITED STATES PATENT AND TRADEMARK OFFICE
CERTIFICATE OF CORRECTION

PATENT NO. : 5,482,560
DATED : January 9, 1996
INVENTOR(S) : Robert N. Ammeraal et al.

It is certified that error appears in the above-indentified patent and that said Letters Patent is hereby corrected as shown below:

Column 1, line 27, change "molification" to --modification--;
line 29, after "source" insert --,--;
line 34, change "cotaminants" to --contaminants--;

line 63, change "he" to --the--.

Column 6, line 44 (claim 7), change "bet-a" to --beta--.

Signed and Sealed this

Seventh Day of May, 1996

Attest:

BRUCE LEHMAN

Attesting Officer

Commissioner of Patents and Trademarks